United States Patent
Shi et al.

(10) Patent No.: US 10,044,277 B2
(45) Date of Patent: Aug. 7, 2018

(54) REGULATION OF THE POWER SUPPLY VOLTAGE FOR A FLYBACK CONVERTER CONTROLLER

(71) Applicant: Dialog Semiconductor, Campbell, CA (US)

(72) Inventors: Fuqiang Shi, Campbell, CA (US); Duc Doan, Campbell, CA (US); Hien Bui, Campbell, CA (US); Xiaye Wang, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 14/584,991

(22) Filed: Dec. 29, 2014

(65) Prior Publication Data
US 2016/0164421 A1    Jun. 9, 2016

Related U.S. Application Data

(60) Provisional application No. 62/089,129, filed on Dec. 8, 2014.

(51) Int. Cl.
*H02M 3/335* (2006.01)
*H02M 1/00* (2006.01)

(52) U.S. Cl.
CPC .............. *H02M 3/33523* (2013.01); *H02M 2001/0035* (2013.01); *Y02B 70/16* (2013.01)

(58) Field of Classification Search
CPC ......... H02M 3/33507; H02M 3/33523; H02M 2001/0035; Y02B 70/16
See application file for complete search history.

(56) References Cited

U.S. PATENT DOCUMENTS

| | | | |
|---|---|---|---|
| 2010/0309690 A1 | 12/2010 | Kawabe et al. | |
| 2011/0103104 A1* | 5/2011 | Zhan | H02M 3/33507 363/21.17 |
| 2013/0241509 A1* | 9/2013 | Chung | G05F 1/46 323/282 |

OTHER PUBLICATIONS

Translation of Office Action dated Jun. 30, 2016 from corresponding German Application No. 102015215653.2 (10 pages).

* cited by examiner

*Primary Examiner* — Jue Zhang
(74) *Attorney, Agent, or Firm* — Haynes and Boone, LLP

(57) ABSTRACT

A switching power converter is provided that includes a detector to detect whether a controller power supply voltage has fallen below a threshold voltage during a dormant period in which a power switch is no longer cycling to deliver power to a load. In response to a detection of such a threshold crossing by the detector, a controller powered by the controller power supply voltage is configured to cycle the power switch to replenish the controller power supply voltage.

16 Claims, 4 Drawing Sheets

US 10,044,277 B2

REGULATION OF THE POWER SUPPLY VOLTAGE FOR A FLYBACK CONVERTER CONTROLLER

RELATED APPLICATIONS

This application claims the benefit of U.S. Provisional Application No. 62/089,129, filed Dec. 8, 2014, the contents of which are incorporated herein in their entirety.

TECHNICAL FIELD

This application relates to switching power converters, and more particularly to the regulation of the power supply voltage for a switching power supply controller.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides safe isolation from AC household current. This isolation introduces a problem in that the power switching occurs at the primary side of the transformer but the load is on the secondary side. The power switching modulation for a flyback converter requires knowledge of the output voltage on the secondary side of the transformer. Such feedback can be obtained through opto-isolators bridging from the secondary side to the primary side but this adds to cost and control complexity. Thus, primary-only feedback techniques have been developed that use the reflected voltage on the primary side of the transformer in each switching cycle.

In a switching cycle for a flyback converter, the secondary current (the current in the secondary winding of the transformer) pulses high after the primary-side power switch is cycled off. The secondary current then ramps down to zero as power is delivered to the load. The delay between the power switch off time and the secondary current ramping to zero is denoted as the transformer reset time (Trst). The reflected voltage on the primary winding at the transformer reset time is proportional to the output voltage because there is no diode drop voltage on the secondary side as the secondary current has ceased flowing. The reflected voltage at the transformer reset time is thus directly proportional to the output voltage based upon the turn ratio in the transformer and other factors. Primary-only feedback techniques use this reflected voltage to efficiently modulate the power switching and thus modulate the output voltage.

The reflected voltage not only provides feedback information but is also used to power the controller that controls the cycling of the power switch. For example, the reflected voltage may be rectified and filtered across a controller power supply voltage capacitor to produce a power supply voltage for the controller. This usage of the reflected voltage to power the controller presents a problem, however, during low-load or no-load periods of operation. This problem may be better understood with reference to FIGS. 1A through 1E. FIG. 1A illustrates how the load current may suddenly shut off in response to, for example, a user disconnecting a portable device from a switching power supply. The load voltage will then slowly decline within a regulation envelope as shown in FIG. 1B. The corresponding power switching cycles are shown in FIG. 1C, which illustrates the cessation of the cycles upon the removal of the load.

Although the power switch has stopped cycling, the controller current is essentially constant as shown in FIG. 1D. Since the controller continues to burn power despite the lack of switching, its power supply voltage may fall out of regulation as shown in FIG. 1E. In that regard, the controller receives its power supply voltage through rectification of the reflected voltage pulses. But such pulses are not generated if the power switch is not cycling. Since the controller current may remain constant, the controller power supply voltage may thus fall relatively rapidly out of regulation, which then triggers a shutdown and reset of the controller. To alleviate this problem, one solution is to over-design the controller power supply voltage capacitor. But such a solution raises costs.

Accordingly, there is a need in the art for improved regulation of the controller power supply voltage for flyback converters.

SUMMARY

A flyback converter is disclosed that regulates its controller power supply voltage during dormant periods in which the power switch is not cycling. During each dormant period, the controller responds to a determination that the controller power supply voltage has decreased below a threshold level by triggering at least one controller-power-supply-voltage cycle of the converter power switch. Just like the conventional power switch cycles used to deliver power to the load, the controller-power-supply-voltage cycle of the power switch produces a reflected voltage that replenishes the controller power supply voltage. In this fashion, the conventional problems of either overdesigning the controller power supply capacitor or suffering from controller resets due to the controller power supply voltage dropping out of regulation during the power switch cycling dormant periods are alleviated.

As compared to the power switch cycles used to deliver power to the load, the controller-power-supply-voltage cycles may be shorter (in particular, the on times of the power switch may be shorter in the controller-power-supply-voltage cycle of the power switch) so that the output voltage is not driven out of regulation. The amount of power required by the controller is relatively small so such smaller cycles provides sufficient power without the danger of over-regulating the output voltage. These advantageous features may be better appreciated with regard to the following description of example embodiments.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for improved controller power supply voltage regulation, a flyback converter is provided that is configured to compare a sensed version of the controller power supply voltage to a reference voltage. If the sensed version of the controller power supply voltage is less than the reference voltage, the controller triggers a controller-power-supply-voltage cycle of the power switch. The resulting reflected voltage pulse from the controller-power-supply-voltage cycle maintains the controller power supply in regulation. These advantageous features may be better appreciated with regard to the following example embodiments.

Figure 1A:
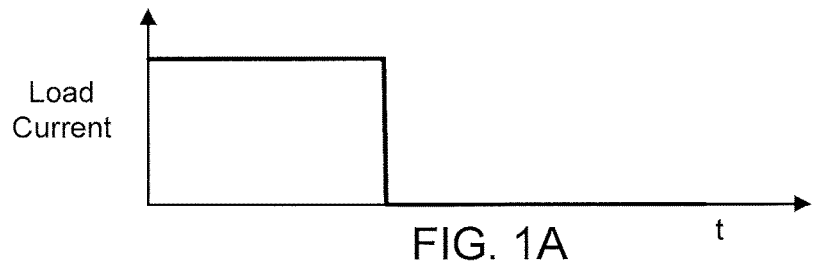
FIG. 1A is a waveform for a negative discontinuity in the output current for a flyback converter such as occurs upon removal of a load.
Figure 1B:
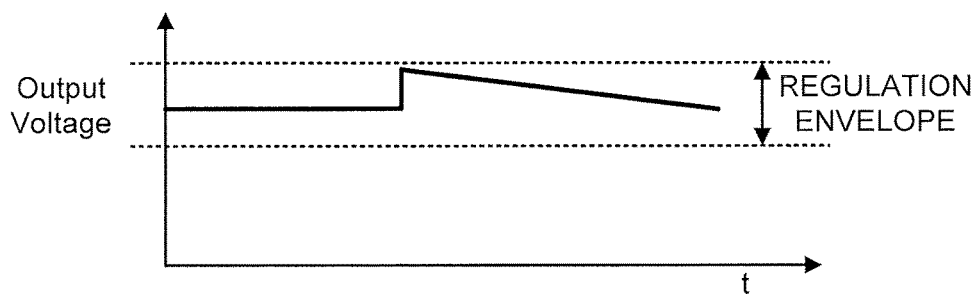
FIG. 1B illustrates the output voltage waveform for the flyback converter of FIG. 1A.
Figure 1C:
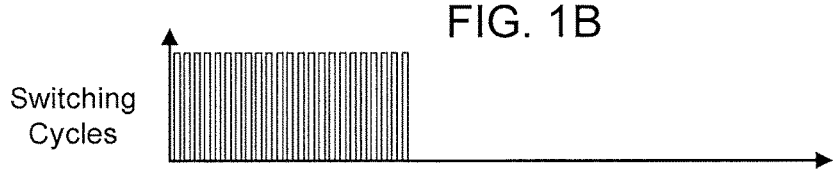
FIG. 1C illustrates the switching cycles for the flyback converter of FIG. 1A.
Figure 1D:
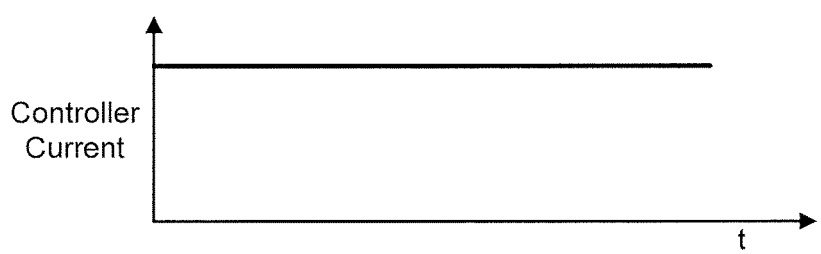
FIG. 1D illustrates the controller current waveform for the flyback converter of FIG. 1A.
Figure 1E:
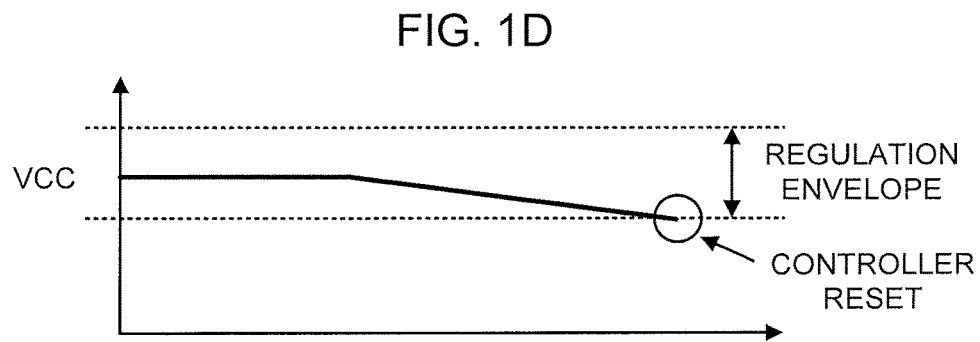
FIG. 1E illustrates the controller power supply voltage waveform for the flyback converter of FIG. 1A.
Figure 2:
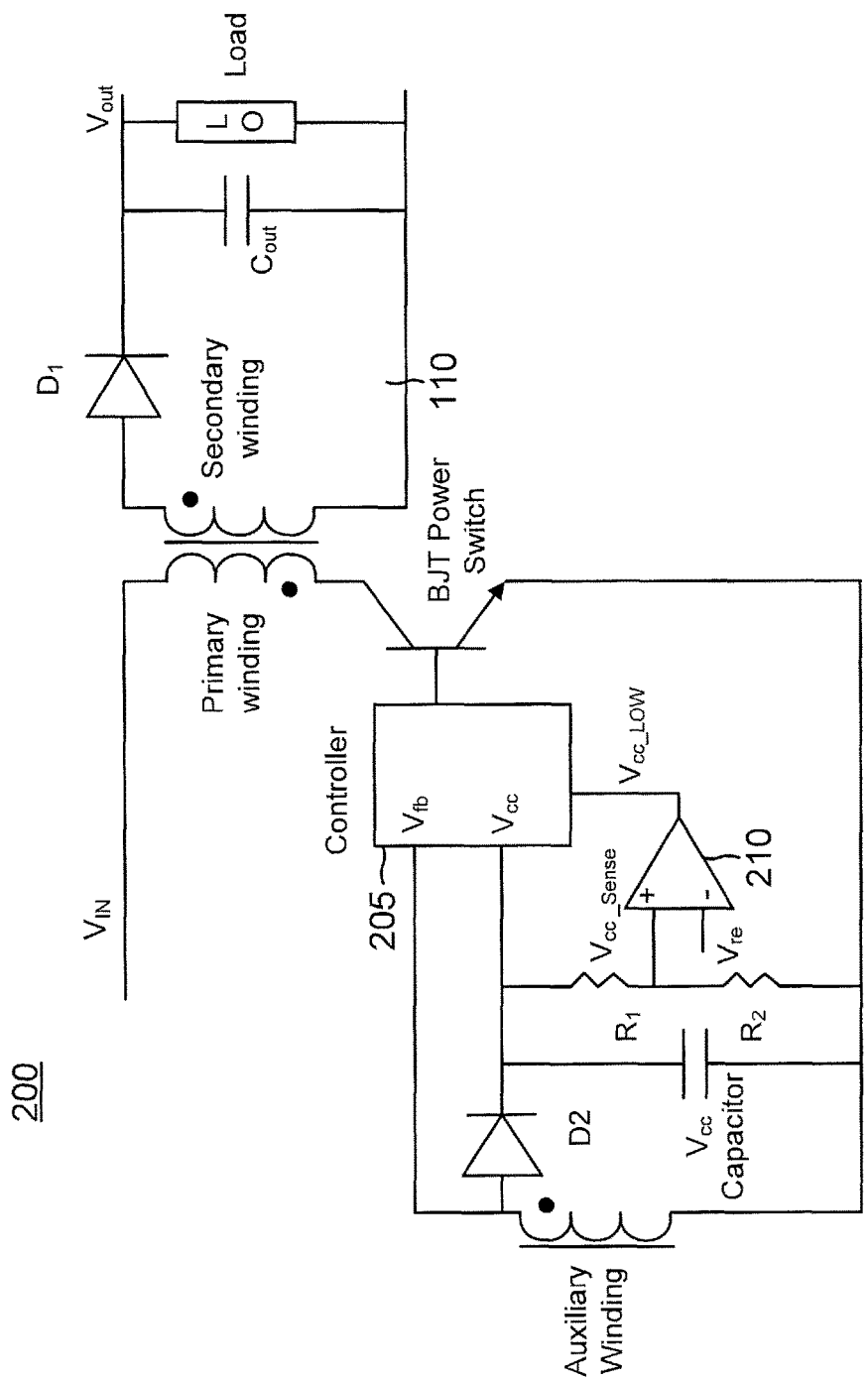
FIG. 2 is a circuit diagram of a flyback converter including a controller power supply voltage regulator in accordance with an embodiment of the disclosure.

An example flyback converter 200 is shown in FIG. 2. A rectified input voltage ($V_{IN}$) drives a primary winding of a transformer when a controller 205 switches on a power switch. In converter 200, the power switch is a bipolar junction transistor (BJT) but it will be appreciated that other types of switches such as metal-oxide field effect transistor (MOSFET) power switches may be used in alternative embodiments. To cycle the power switch on, controller 205 drives a base current into the base of the BJT power switch to drive it into saturation. The saturated BJT power switch then responds by conducting a collector current that depends upon the input voltage $V_{IN}$ and the magnetizing inductance of the transformer. Based upon these factors, the collector current (which corresponds to the primary winding current in the transformer) will ramp up from zero to a peak collector current value, whereupon controller 205 switches off the BJT power switch to complete a power switch cycle. Controller 205 monitors a feedback (Vfb) voltage derived from a reflected voltage on an auxiliary winding to determine when the peak collector current has been achieved so that it may then turn off the BJT power switch. In response to controller 205 turning off the base current to turn off the BJT power switch, a rectifying diode $D_1$ on the secondary side becomes forward biased such that the stored energy in the transformer is delivered as an output voltage ($V_{out}$) across a load. A load capacitor $C_{out}$ maintains the output voltage $V_{out}$ upon completion of the energy delivery in each switching cycle. As the secondary winding current pulses down to zero, it produces a reflected voltage on the primary-side auxiliary winding that is a function of the voltage drop across the diode $D_1$ and the output voltage $V_{out}$. As the secondary current drops to zero such that there is no diode voltage drop, the reflected voltage pulse on the auxiliary winding becomes directly proportional to Vout. As discussed earlier, this time is denoted as the transformer reset time (Trst), which represents the ideal time to sample the reflected voltage pulse to obtain a feedback voltage $V_{fb}$ that may be processed by the controller to provide an accurate estimate of the output voltage $V_{out}$.

The reflected voltage pulse on the auxiliary winding is also used to produce a controller power supply voltage (VCC) for controller 205. For example, the reflected voltage may be rectified and filtered through a rectifying and filtering network such as comprising a diode D2 and a controller power supply (VCC) capacitor to produce the controller power supply voltage VCC. This production of the controller power supply voltage VCC is thus dependent on controller 205 cycling the BJT power switch. However, the necessary cycling of the BJT power switch is absent during power switch cycling dormant periods such as when the load is removed. To keep the controller power supply voltage VCC in regulation despite the BJT power switch being quiescent during such dormant periods, a comparator 210 is provided that compares a sensed version (VCC_Sense) of the controller power supply voltage VCC to a reference voltage Vre. Reference voltage Vre may be generated using, for example, a bandgap reference circuit (not illustrated). A voltage divider such as formed through resistors R1 and R2 produces the sensed version VCC_Sense of the controller power supply voltage Vcc that comparator 210 compares to the threshold voltage Vre. If the sensed version VCC_Sense of the controller power supply voltage VCC drops below the threshold voltage Vre, comparator 210 asserts its output signal Vcc_LOW (indicating that the controller powers supply voltage VCC is becoming close to dropping out of regulation).

Controller 205 is configured to respond to the indication that the controller supply voltage VCC is low (such as through assertion of the Vcc_LOW signal) by triggering a controller-power-supply-voltage cycle of the BJT power switch. Since the resulting current pulse is being generated to replenish the controller power supply voltage VCC rather than to regulate the output voltage $V_{out}$, the switch on time of the controller-power-supply-voltage cycle may be relatively short such as used in a low energy switching mode. For example, controller 205 may respond to the assertion of the Vcc_LOW signal by cycling the BJT power switch on with its minimum-allowable on time. In alternative embodiments, controller 205 may trigger a series of such cycles rather than just one. In contrast to the controller-power-supply-voltage cycle of the power switch, the power switch cycles used to deliver power to the load may be denoted herein as power cycles.

Figure 3A:
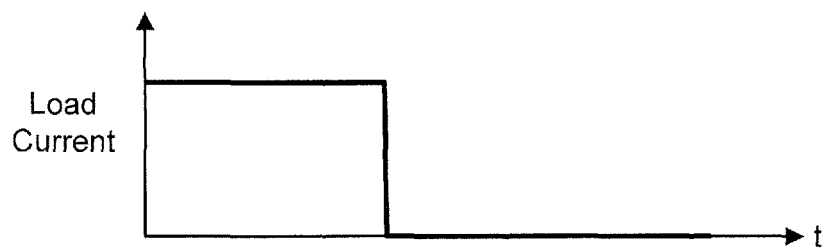
FIG. 3A is a waveform for a negative discontinuity in the output current for the flyback converter of FIG. 2.
Figure 3B:
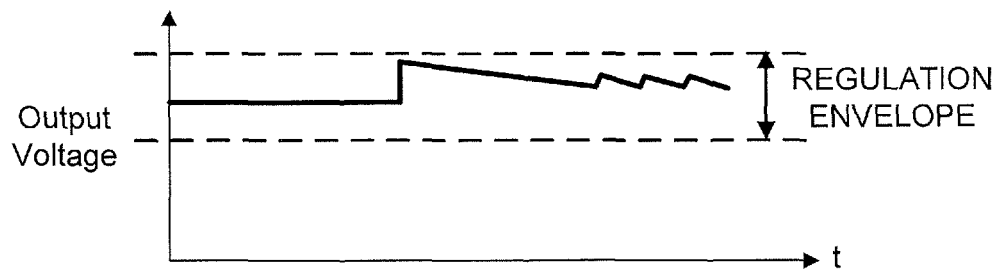
FIG. 3B illustrates the output voltage for the flyback converter of FIG. 3A.
Figure 3C:
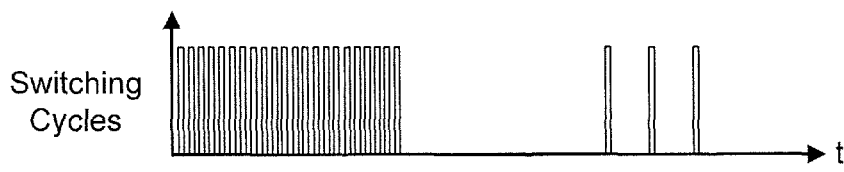
FIG. 3C illustrates the switching cycles for the flyback converter of FIG. 3A.
Figure 3D:
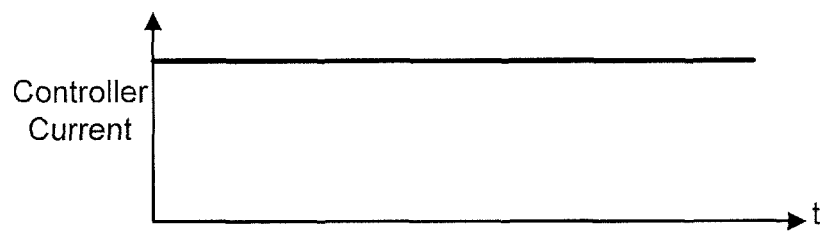
FIG. 3D illustrates the controller current for the flyback converter of FIG. 3A.
Figure 3E:
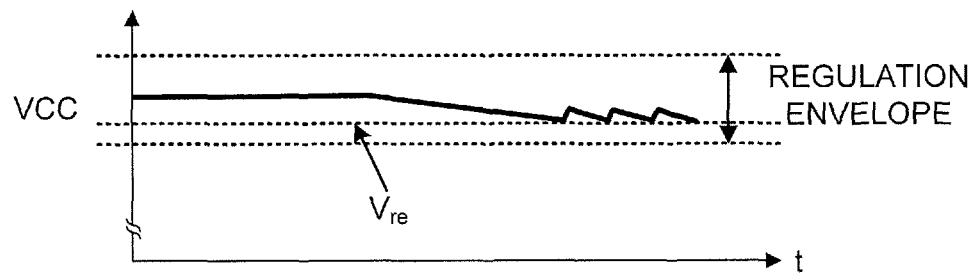
FIG. 3E illustrates the controller power supply voltage for the flyback converter of FIG. 3A.

The resulting advantageous regulation of the controller power supply voltage VCC may be better appreciated with regard to some example waveforms. FIG. 3A illustrates how the load current may suddenly shut off in response to, for example, a user disconnecting a load such as a portable device from switching power converter 200. The output voltage will then slowly decline within a regulation envelope as shown in FIG. 3B. But the current used by controller 205 remains approximately constant as shown in FIG. 3D. The controller power supply voltage VCC will then begin to decline towards the threshold voltage Vre threshold as shown in FIG. 3E. When the controller power supply voltage VCC slips below the threshold voltage Vre, a controller-power-supply-voltage cycle is triggered as shown in FIG. 3C. In this example, the controller power supply voltage VCC descends below the threshold Vre at three separate times so there are three corresponding controller-power-supply-voltage switching cycles shown in FIG. 3C. In alternative embodiments, more than one switching cycle may be triggered when the controller power supply VCC dips below the threshold voltage Vre. Regardless of the number of pulses that are triggered, the advantageous result is that the controller power supply voltage Vcc remains within the desired regulation envelope. In contrast, a conventional flyback converter would have its controller power supply voltage fall out of regulation or require an over-engineered controller power supply voltage capacitor as discussed earlier.

Figure 4:
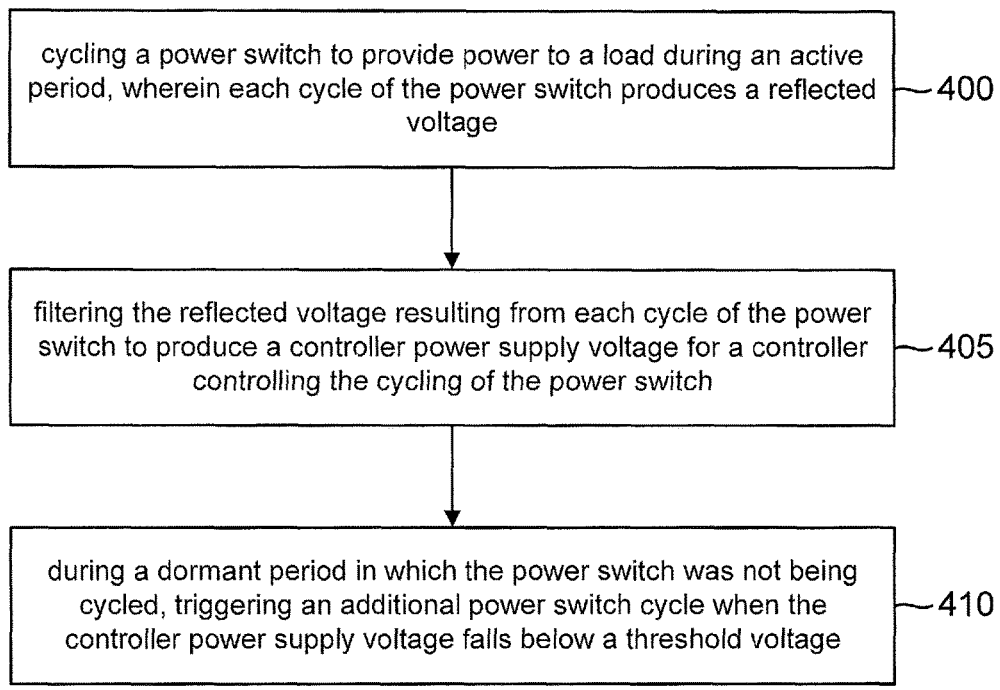
FIG. 4 is a flowchart for an example method of regulating the power supply voltage for a flyback converter controller in accordance with an embodiment of the disclosure.

An example method of operation for the regulation of a controller power supply voltage is illustrated in the flowchart of FIG. 4. The method includes an act 400 of cycling a power switch to provide power to a load during an active period, wherein each cycle of the power switch produces a reflected voltage. The initial train of power switch cycling shown in FIG. 3B is an example of such cycling. Each cycle produces a reflected voltage across the auxiliary winding as discussed with regard to power converter 200. The method also includes an act 405 of filtering the reflected voltage resulting from each cycle of the power switch to produce a controller power supply voltage for a controller controlling the cycling of the power switch. The smoothing of the reflected voltage by diode D2 and power supply capacitor VCC as discussed with regard to power converter 200 is an example of act 405. Finally, the method includes an act 410 that is performed during a dormant period in which the power switch was not being cycled. This act comprises triggering an additional power switch cycle when the controller power supply voltage falls below a threshold voltage. The triggering by controller 205 of an additional power switch cycle in response to the detection by comparator 210 that the controller power supply voltage VCC is less than the threshold voltage Vre is an example of act 410.

As those of some skill in this art will by now appreciate and depending on the particular application at hand, many modifications, substitutions and variations can be made in and to the materials, apparatus, configurations and methods of use of the devices of the present disclosure without departing from the scope thereof. For example, alternative detectors as compared to the use of a comparator may be used with regard to determining if the power switch should be cycled to bolster the controller power supply voltage. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter, comprising:
a controller configured to cycle a power switch coupled to a primary winding of a transformer such that each cycle of the power switch produces a reflected voltage pulse from an output voltage on a secondary side of the switching power converter, and wherein the controller is configured to be powered by a controller power supply voltage derived from each reflected voltage pulse and wherein the controller is configured to sense the reflected voltage pulse at a transformer reset time corresponding to a secondary winding current in the transformer ramping to zero to provide an estimate of the output voltage; and
a detector configured to detect whether the controller power supply voltage falls below a threshold voltage during a dormant period in which the controller is not cycling the power switch, wherein the controller is further configured to trigger a controller-power-supply-voltage cycle of the power switch responsive to a detection that the controller power supply voltage provided from only the primary side has fallen below the threshold voltage.

2. The switching power converter of claim 1, wherein the detector comprises a comparator configured to compare a sampled version of the controller power supply voltage to the threshold voltage to detect whether the controller power supply voltage has fallen below the threshold voltage.

3. The switching power converter of claim 1, further comprising a rectifying and filtering network configured to rectify and filter each reflected voltage pulse to produce the controller power supply voltage.

4. The switching power converter of claim 1, further comprising the power switch.

5. The switching power converter of claim 4, wherein the power switch comprises a bipolar junction transistor power switch.

6. The switching power converter of claim 4, wherein the power switch comprises a MOSFET power switch.

7. The switching power converter of claim 1, wherein the controller is further configured to power cycle the power switch to deliver power to a load, and wherein each power cycle has a switch on time that is greater than a switch on time in the controller-power-supply-voltage cycle of the power switch.

8. The switching power converter of claim 1, wherein the controller is further configured such that the controller-power-supply-voltage cycle comprise a plurality of controller-power-supply-voltage cycles.

9. The switching power converter of claim 2, further comprising a voltage divider configured to provide the sampled version of the controller power supply voltage.

10. The switching power converter of claim 1, further comprising an auxiliary winding configured to provide each reflected voltage pulse.

11. A method, comprising:
cycling a power switch to provide power to a load during an active period, wherein each cycle of the power switch produces a reflected voltage pulse from an output voltage at a secondary side of a transformer for a switching power converter;
sampling the reflected voltage pulses at a transformer reset time when a secondary winding current for the transformer ramps to zero to sample the output voltage;
entering a dormant period in which the power switch is not cycled in response to the sampling of the reflected voltage pulse indicating that no load is being applied to the switching power converter;
rectifying and filtering each reflected voltage pulse to produce a controller power supply voltage for a controller controlling the cycling of the power switch, the controller receiving inputs from only a primary side of a switching power converter; and
during the dormant period in which the power switch was not being cycled, triggering a controller-power-supply-voltage cycle of the power switch responsive to the controller power supply voltage falling below a threshold voltage.

12. The method of claim 11, wherein cycling the power switch comprises cycling a bipolar junction transistor power switch.

13. The method of claim 11, wherein cycling the power switch comprises cycling a MOSFET transistor power switch.

14. The method of claim 11, further comprising comparing the controller power supply voltage to the threshold voltage to determine when the controller power supply voltage falls below the threshold voltage.

15. The method of claim 11, wherein the controller-power-supply-voltage cycle of the power switch comprises a plurality of controller-power-supply-voltage cycles.

16. The method of claim 11, wherein the controller-power-supply-voltage cycle of the power switch has a switch on time that is less than switch on times used during the active period.

\* \* \* \* \*